(12) United States Patent
Pul

(10) Patent No.: US 10,502,292 B2
(45) Date of Patent: Dec. 10, 2019

(54) CANTILEVER BEAM LINKAGE

(71) Applicant: George Pul, Las Vegas, NV (US)

(72) Inventor: George Pul, Las Vegas, NV (US)

( * ) Notice: Subject to any disclaimer, the term of this patent is extended or adjusted under 35 U.S.C. 154(b) by 290 days.

(21) Appl. No.: 15/652,262

(22) Filed: Jul. 18, 2017

(65) Prior Publication Data

US 2019/0024765 A1    Jan. 24, 2019

(51) Int. Cl.
| F16H 21/54 | (2006.01) |
| F16H 21/44 | (2006.01) |
| B64C 33/02 | (2006.01) |
| B63H 16/06 | (2006.01) |
| B63H 16/04 | (2006.01) |

(52) U.S. Cl.
CPC ............ *F16H 21/54* (2013.01); *B63H 16/06* (2013.01); *B64C 33/02* (2013.01); *F16H 21/44* (2013.01); *B63H 16/04* (2013.01)

(58) Field of Classification Search
CPC ........ F16H 19/005; F16H 21/44; F16H 21/54; B63H 16/06; B63H 16/04; B63H 16/102; B63H 16/105; B64C 33/02; B64C 33/00; B64C 2201/025
USPC ........................... 440/102; 74/96; 244/22, 72
See application file for complete search history.

(56) References Cited

U.S. PATENT DOCUMENTS

| 325,055 | A | * | 8/1885 | Clark | |
| 951,464 | A | * | 3/1910 | Stewart | |
| 1,070,448 | A | * | 8/1913 | Gilbertson | B63H 16/105 |
| | | | | | 440/102 |
| 1,799,440 | A | * | 4/1931 | Ramstad | B63H 16/105 |
| | | | | | 440/102 |
| 3,729,369 | A | * | 4/1973 | Trull | B63H 16/102 |
| | | | | | 440/102 |
| 4,567,782 | A | * | 2/1986 | Speicher | F16H 21/12 |
| | | | | | 74/519 |
| 4,580,436 | A | * | 4/1986 | Nelson | B30B 15/00 |
| | | | | | 100/228 |
| 5,647,782 | A | * | 7/1997 | Henry | B63H 16/105 |
| | | | | | 440/102 |
| 7,144,284 | B1 | * | 12/2006 | Horan | B63H 16/04 |
| | | | | | 440/102 |
| 7,708,610 | B1 | * | 5/2010 | Horan | B63H 16/06 |
| | | | | | 440/101 |

* cited by examiner

*Primary Examiner* — David H Bollinger

(57) ABSTRACT

A Cantilever Beam Linkage is disclosed for a mechanism and structural support to power and control a cantilever beam in reciprocal motions, by adopting and using planar 4-bar parallelogram linkages, typically for drive mechanisms, into mechanisms to function as guided roller supports, free to translate but fixed for rotational motions; and as load separators where forces and moments are separated. A Cantilever Beam Linkage is applicable for a cantilever beam in reciprocal motions to have its powering and controlling applied forces confined within narrow bodies, to have the cantilever beam extends out multiple times the narrow body width, and to have applied forces equal to response forces; and is particularly suitable for applications such as: a rowing boat oar and a flying machine flapping wing.

4 Claims, 4 Drawing Sheets

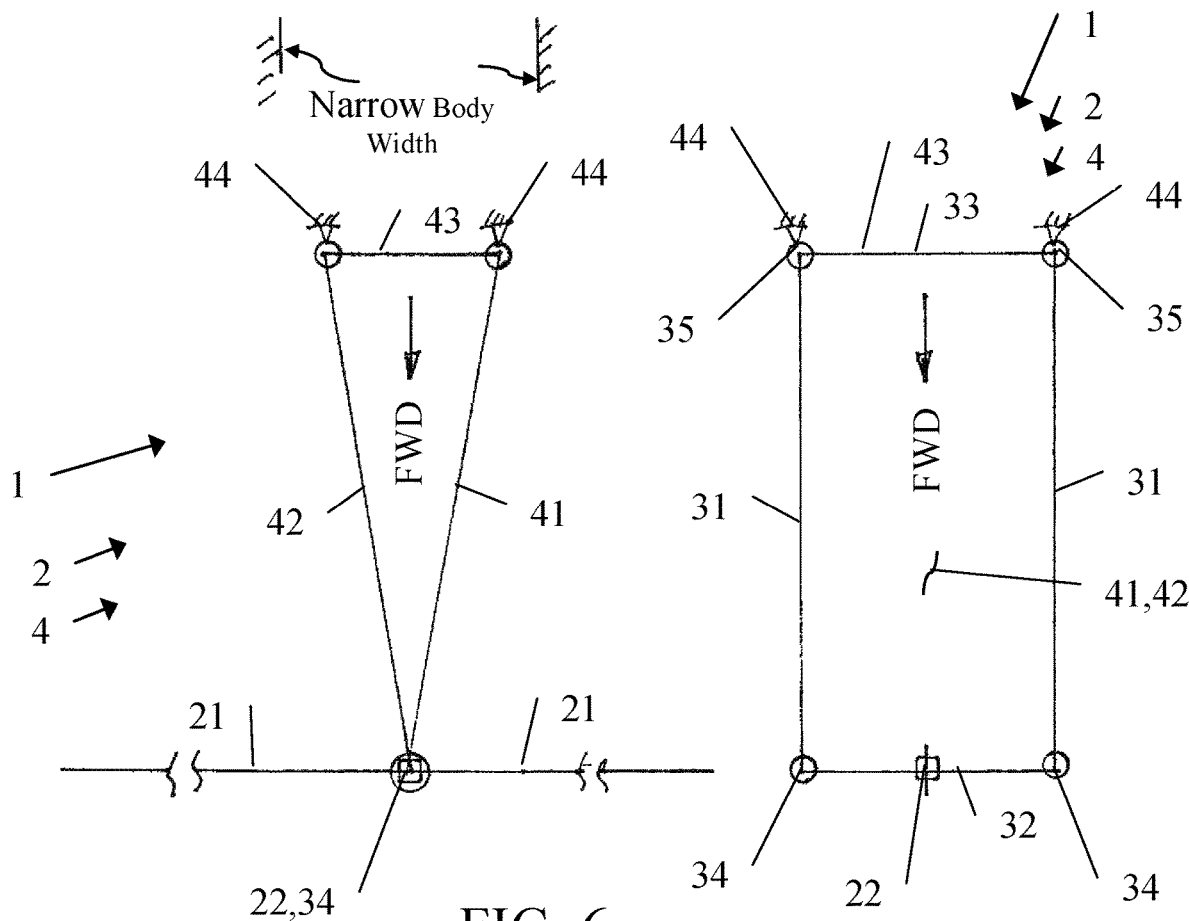
FIG. 6
FIG. 7
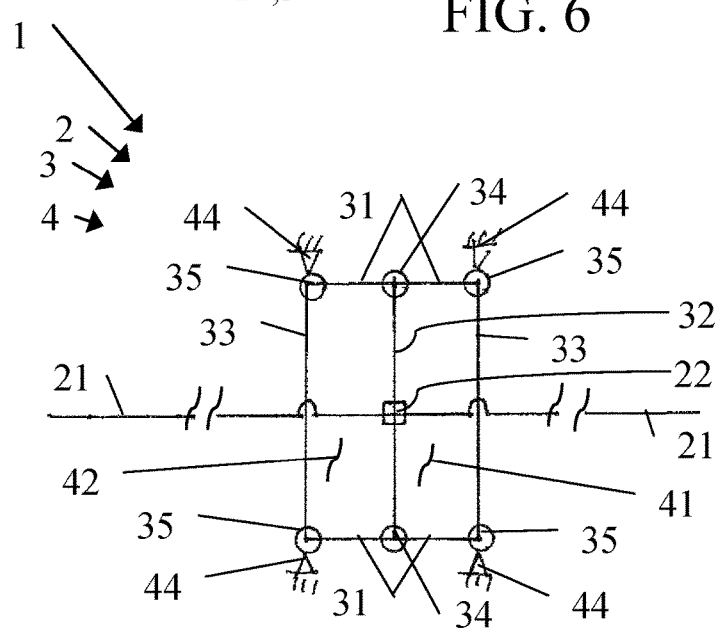
FIG. 8

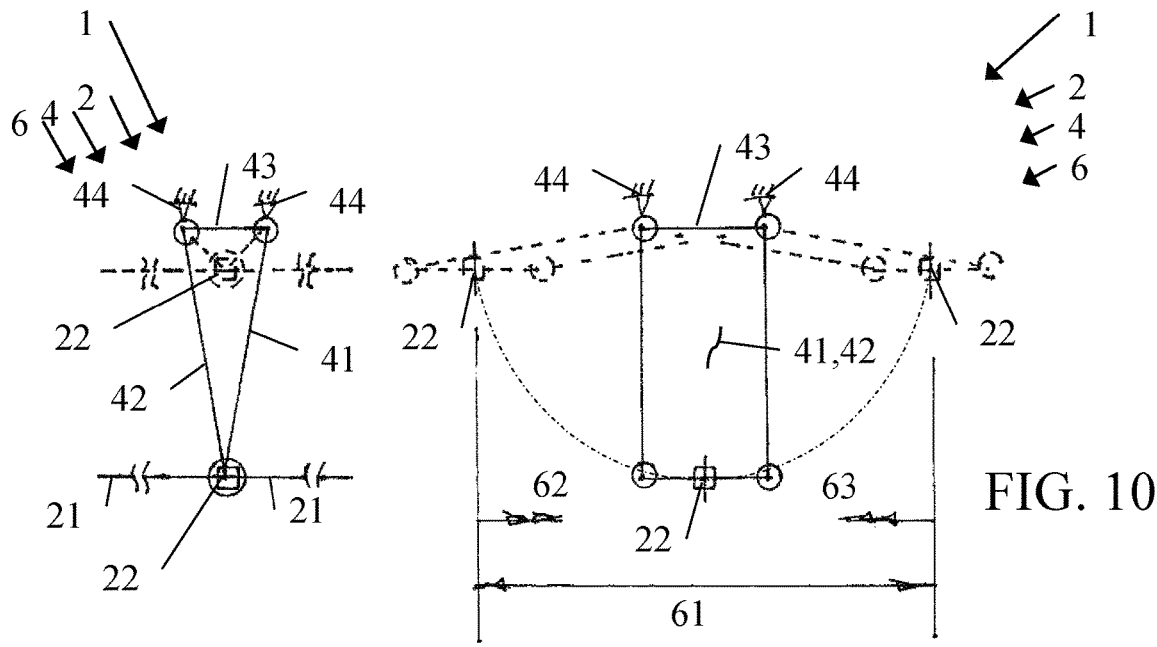
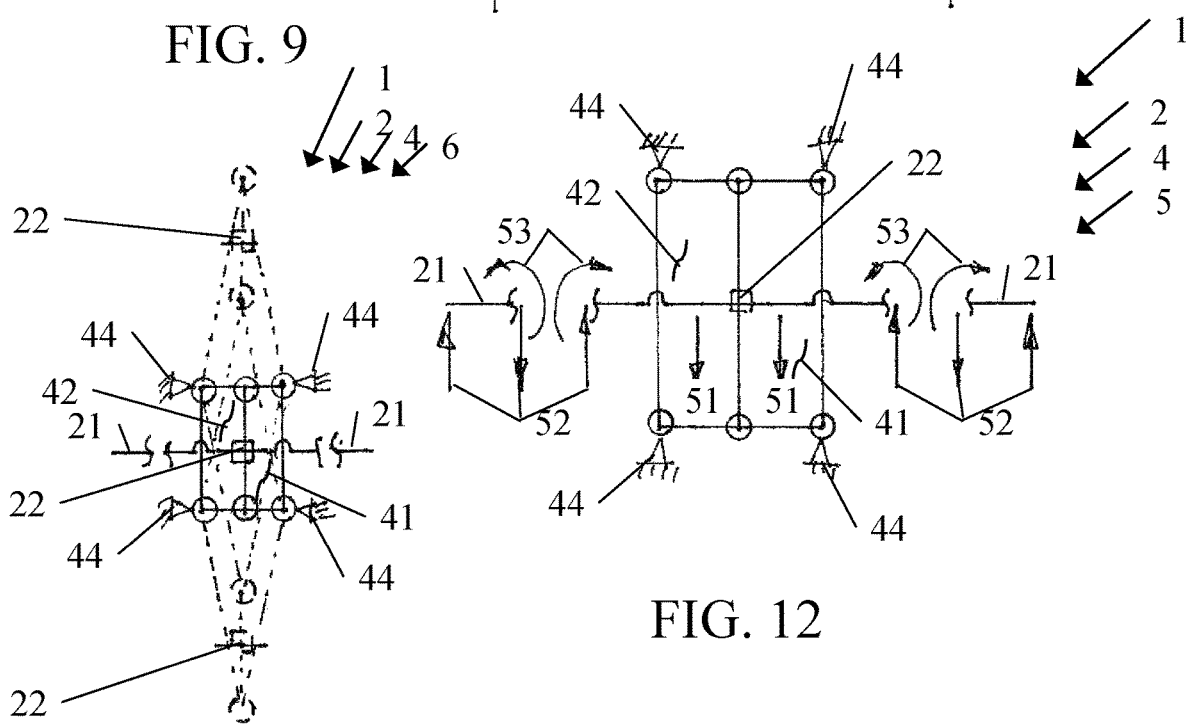
FIG. 9
FIG. 10
FIG. 11
FIG. 12

CANTILEVER BEAM LINKAGE

BACKGROUND OF THE INVENTION

Human dreamed since the beginning of time to fly like a bird by human power alone powering a set of flapping wings, but to date it remained an unrealized dream; for not a single flying machine, including machines built based on Deviance's famous flying machine sketches, has achieved human flight through his own power alone powering a set of flapping wings. A flying machine has to generate a lift force greater than its total weight, and human power alone has achieved flights for fixed wing flying machines to demonstrate conclusively too the potential for human power alone to achieve flights like birds by flapping a set of wings. What is needed in the art is a mechanism and structural support subsystem for use in such applications as a flying machine where human has finally realizes his dream to fly like a bird through his own power alone powering a set of flapping wings.

SUMMARY OF THE INVENTION

A Cantilever Beam Linkage of the present invention is generally directed to a mechanism and structural support for cantilever beams in reciprocal stroke motions, such as in applications for rowing boat oars or flapping aircraft/bird wings, where applied forces are confined within narrow or narrow and long bodies, and where applied forces may require long stroke motions.

A Cantilever Beam Linkage of the present invention, a mechanism and structural support for a cantilever beam in reciprocal stroke motions, powers and controls a cantilever beam through methods that include: adopting one- or two-planar 4-bar parallelogram linkage, typically used for drive mechanisms, into a mechanism having one degree of freedom to function as a guided roller support, free to translate but fixed for rotation, and as a load separator, where forces and moments are separated; and fixed mounting a cantilever beam on, in motion with, applying loads to, and has its stroke distance set by an adopted one- or two-planar 4-bar parallelogram linkage.

A Cantilever Beam Linkage of the present invention, a mechanism and structural support for a cantilever beam in reciprocal stroke motions, comprises: a cantilever beam fixed mounted on and in motion with either one- or two-planar 4-bar parallelogram linkages, typically are drive mechanisms, but are adopted into mechanisms to function as guided roller supports and loads separators; and been ground support by 3-D pinned joints.

A cantilever beam is aligned and in-plane of a narrow body width, and extends out of a narrow body, and through a fixed joint, is fixed mounted on and in motion with either one or two-planar 4-bar parallelogram linkage. Subjected to in-plane applied reciprocal forces anywhere along the beam, generally within the narrow body width, the cantilever beam move in reciprocal stroke motions, generating response forces equal to applied forces, regardless of the narrow body width relative to the length the cantilever beam is extended out of the narrow body.

One-planar 4-bar parallelogram linkage is aligned and fit within a narrow body width, and further comprises: two identical parallel grounded links that rotate; a floating link, onto which is fixed mounted a cantilever beam, and translate parallel to a ground link of same length; a ground link representing the ground; and pin joints connecting links in 2-D plane.

Two-planar 4-bar parallelogram linkage is a 3 sided triangular space truss to fit within a long and narrow body, and further comprises: two identical one-planar 4-bar parallelogram linkages on sides 1 and 2, joined by a shared floating link, onto which is fixed mounted a cantilever beam, and having mid-plane of side 1 and 2 aligned and fit within the long body length; side 3 has two parallel ground links for base support, and is aligned and fit within the narrow body width; and same connecting joints as in one-planar 4-bar parallelogram linkage, except shared floating link is connected to grounded links by 3-D pin joints.

Either one- or two-planar 4-bar parallelogram linkages, which are typically drive mechanisms, but are adopted into mechanisms to function as guided roller supports and loads separators. One-planar 4-bar parallelogram linkage is a simple mechanism with only one in plane degree of freedom to function as a guided roller support in 2-D plane, free to translate, but fixed from rotation, where a cantilever beam is fixed mounted to the floating link that moves in parallel to the ground link to a maximum reciprocal stroke motion distance equal to two times grounded link length. It further functions as a loads separator to separate cantilever beam applied and response forces from response forces induced bending moments at where the cantilever beam is fixed mounted to the floating link, and where response forces are equal to the applied forces, and response force induced bending moments are grounded by one-planar 4-bar parallelogram linkage. Two-planar 4-bar parallelogram linkage is also a mechanism to function as guided roller supports and loads separators, identical to one-planar 4-bar parallelogram linkage, except in 3-D space: it is a triangular space truss with 3 sides and has its floating link in one degree of freedom motion parallel to side 3 of triangular space truss support base, and it has a maximum stroke distance equal to two times grounded link length projected onto the mid-plane of sides 2 and 3 of triangular space truss of two-planar 4-bar parallelogram linkage.

A Cantilever Beam Linkage of the present invention for one-planar 4-bar parallelogram linkage is particular suitable for applications such as rowing boat oars, where oars are cantilever beams with built-in or attached paddles, having applied forces constrained within narrow bodies, and response forces extending out several times the narrow bodies width, but do not require long stroke distance. A Cantilever Beam Linkage of the present invention for two-planar 4-bar parallelogram linkages is particular suitable for applications such as flapping aircraft/bird wings, where wings are attached to cantilever beams, having applied forces constrained within both narrow and long bodies, response forces extending out several times narrow bodies width, and requiring long stroke distances to generate required lift forces for flight.

BRIEF DESCRIPTION OF THE DRAWINGS

FIG. 6 is top view of the 2$^{nd}$ preferred embodiment in center stroke position;

FIG. 7 is side view of the 2$^{nd}$ preferred embodiment in center stroke position;

FIG. 8 is front view of the 2$^{nd}$ preferred embodiment in center stroke position;

FIG. 9 is top view of the 2$^{nd}$ preferred embodiment in a reciprocal stroked motion, both power and return strokes;

FIG. 10 is side view of the 2$^{nd}$ preferred embodiment in a reciprocal stroked motion, both power and return strokes;

FIG. 11 is front view of the 2$^{nd}$ preferred embodiment in a reciprocal stroked motion, both power and return strokes;

FIG. 12 is front view of 2$^{nd}$ preferred embodiment in FIG. 8, showing cantilever beam under applied and response forces, and response force induced response moment.

DESCRIPTION OF THE PREFERRED EMBODIMENT

Figure 1:
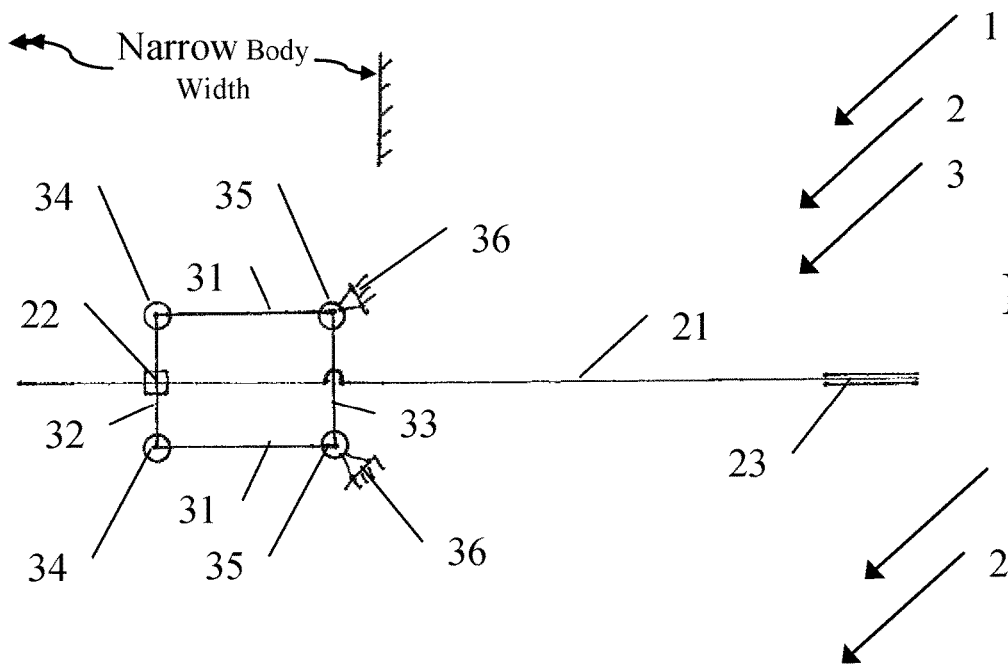
FIG. 1 is top view of 1$^{st}$ preferred embodiment with 4-bar linkage horizontal, in center power or return stroke position, oar paddle in or out water.

Embodiments of the invention of a Cantilever Beam Linkage is a mechanism and structural support for cantilever beams in reciprocal stroke motions, such as in applications for rowing boat oars or flapping aircraft/bird wings, where a cantilever beam has applied forces confined within a narrow or narrow and long body, but are equal to response forces that are extended out multiple times of narrow body width, and where long stroke motions may also be required. Cantilever Beam Linkage 1 of 1$^{st}$ preferred embodiment of the invention for a mechanism and structural support of a rowing boat oar will be described with reference to the drawings, to be followed by Cantilever Beam Linkage 1 of 2$^{nd}$ preferred embodiment of the invention for a mechanism and structural support of flapping aircraft/bird wings to be described with reference to the drawings.

Unless otherwise apparent, or stated, directional references, such as "inner," "inward," "outer," "outward," "downward," "upper", "lower" etc., are for non-limiting descriptive purposes and intended to be relative to the orientation of a particular embodiment of the invention as shown in the view of that embodiment. Parts shown in a given FIGURE are generally proportional in their dimensions. An in-plane assembly, such as a planar 4-bar parallelogram linkage, has all its parts and degrees of freedom generally constrained in its 2-D plane.

Referring to FIGS. 1-5, Cantilever Beam Linkage 1 of 1$^{st}$ preferred embodiment of the invention is a mechanism and structural support for a rowing boat oar, comprising: a cantilever beam assembly 2, aligned and extending out of a narrow body width, is fixed mounted generally at an angle to one-planar 4-bar parallelogram linkage 3 that is aligned and fits within a narrow body width, and been supported by ground supports 36 with 3-D pinned joints. Cantilever Beam Linkage 1, as a mechanism subjected to loading 5, has only one degree of freedom in lateral strokes motion 6 in-plane of one-planar 4-bar parallelogram linkage 3, and is free to be tilted by ground supports 36 with 3-D pinned joints.

Figure 2:
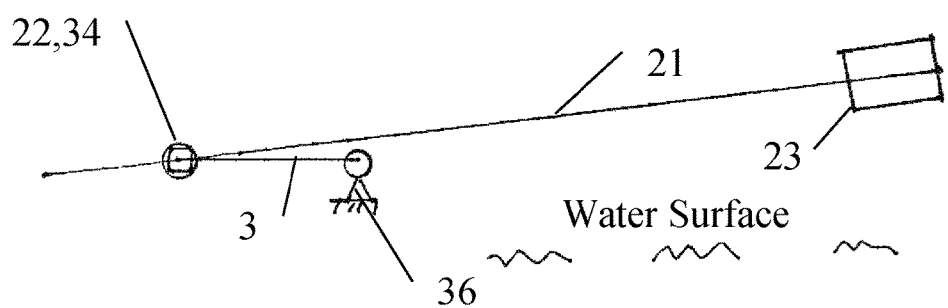
FIG. 2 is front view of 1$^{st}$ preferred embodiment with 4-bar linkage horizontal, in center return stroke position, and oar paddle out water.
Figure 3:
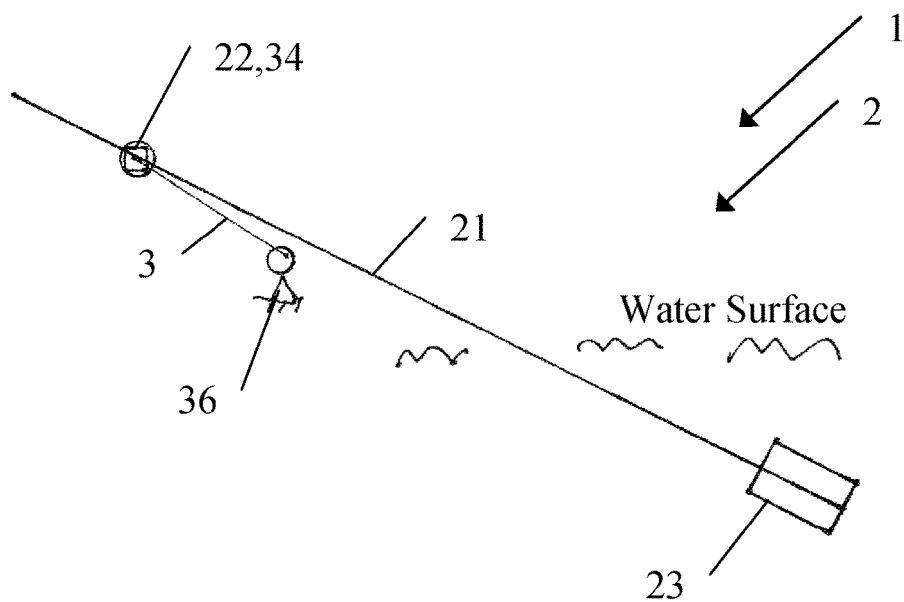
FIG. 3 is front view of 1$^{st}$ preferred embodiment with 4-bar linkage tilted from horizontal, in center power stroke position, and oar paddle in water.

Shown particularly in FIGS. 1, 2, and 3 are Cantilever Beam Linkage 1 tilted to have paddle 23 in or out of water, and cantilever beam assembly 2 further comprises: cantilever beam 21, aligned and extends out of a narrow body width, fixed supported along the cantilever beam through fixed support joint 22, and paddle 23 at one end. One-planar 4-bar parallelogram linkage 3, aligned and fits within a narrow body width, is further comprised in 2-D plane of: two identical parallel grounded links 31 on two parallel sides; one floating link 32 of same length as one ground link 33 on the other two parallel sides; floating link 32 connects to grounded links 31 through pin joints 34, translates in parallel to ground link 33, and has fixed mounted on it cantilever beam 21 through fixed support joint 22; grounded links 31 connect to ground link 33 and rotate about pin joints 35; and ground link 33, when representing the ground, and pin joint 35 are removed from one-planar 4-bar parallelogram linkage 3. One-planar 4-bar parallelogram linkage 3 is supported by Ground support 36 with 3-D pinned joints to allow Cantilever Beam Linkage 1 to freely tilt. Cantilever beam assembly 2 is fixed supported and constrained to in-plane motion by one-planar 4-bar parallelogram linkage 3.

Figure 4:
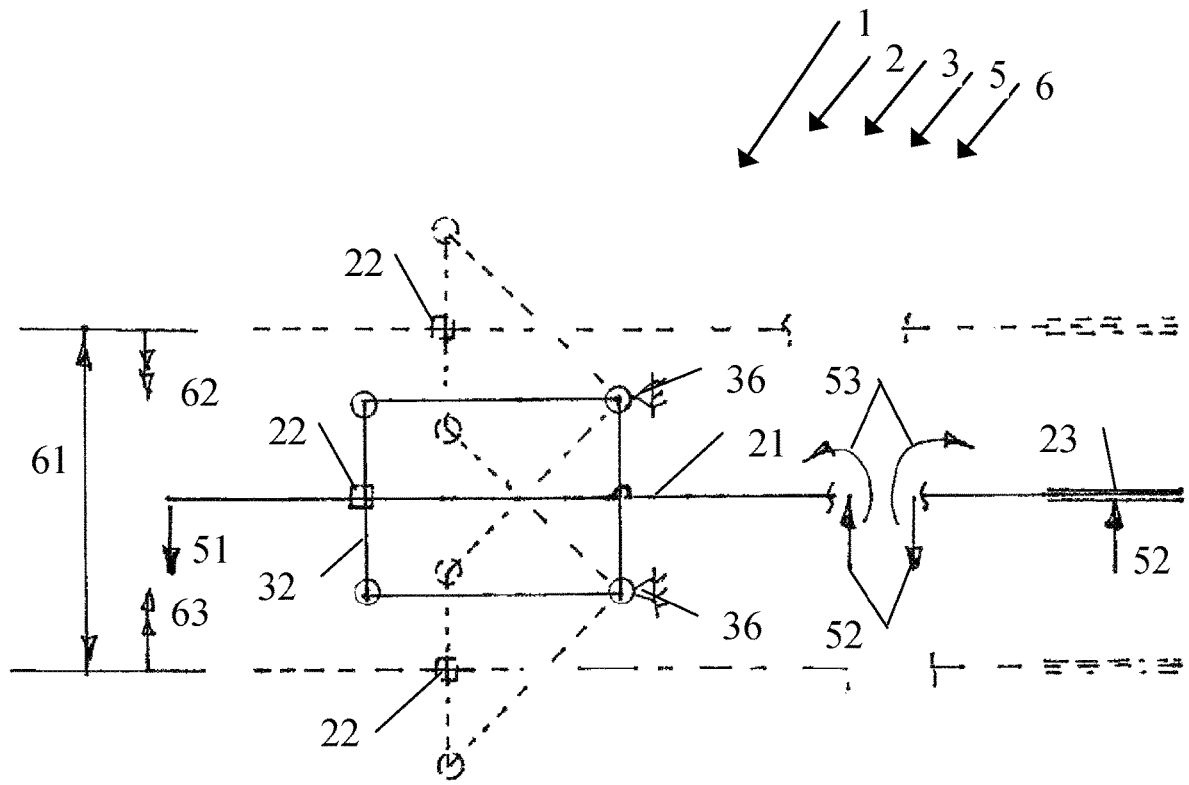
FIG. 4 is top view of 1$^{st}$ preferred embodiment in FIG. 1 in motion and under load, showing stroke motions and applied and response forces, and response force induced response moment.
Figure 5:
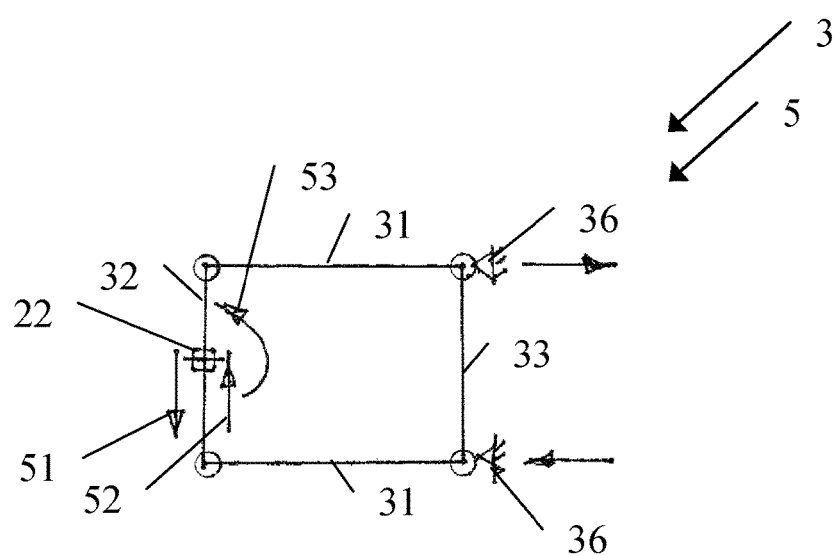
FIG. 5 is free body diagram of one-planar 4-bar parallelogram linkage of 1$^{st}$ preferred embodiment, shown in top view of FIG. 4.

Shown particularly in FIGS. 4 and 5 are Cantilever Beam Linkage 1 of 1$^{st}$ preferred embodiment as an in-plane mechanism, been subjected to reciprocal loads 5, moves in reciprocal motion 6. Cantilever beam 21, subjected to in-plane reciprocal applied forces 51 anywhere along cantilever beam 21, moves in reciprocal stroke motions 6, and generating response forces 52 on paddle 23 equal to applied forces 51, regardless of the narrow body width relative to the cantilever beam 21 length that extents out the narrow body width; where in-plane refers to in-plane of one-planar 4-bar parallelogram linkage 3. Cantilever beam 21 in reciprocal stroke motion 6 has a maximum reciprocal stroke distance 61, same as for floating link 32, equal to 2× the length of grounded links 31, and in one cycle it moves through power stroke 62 and return stroke 63.

One-planar 4-bar parallelogram linkage 3, as a four bar movable closed chain linkage, is the simplest and often times the most useful mechanism, and when subjected to loading, has only in-plane one degree of freedom in lateral stroke motions. One-planar 4-bar parallelogram linkage 3 is typically a drive mechanism, but is adopted as a mechanism that functions as a guided roller support and loads separator for Cantilever Beam Linkage 1 of 1$^{st}$ preferred embodiment. FIG. 4 shows Cantilever Beam Linkage 1 as a mechanism in motion under applied and response forces 51 and 52, respectively. In a typical drive mechanism, a pair of grounded links 31 is load input and output links, and floating link 32 is called a coupler or connecting rod because it connects an input link to an output link. However, for one-planar 4-bar parallelogram 3 to function as a guided roller, free to translate but fixed for rotation, reciprocal applied force 51 and response force 52 are input to floating link 32 through fixed support joint 22 from fixed mounted Cantilever beam 21, to cause floating link 32 moving in reciprocal parallel stroke motions 6 with maximum reciprocal stroke distance 61 that equals to 2× the length of grounded links 31; and making floating link 32 both the load input and output link to function for the fixed mounted cantilever beam 21 as a guided roller support, free to translate in stroke motion 6 but constrained in rotation. Shown in FIG. 5 is free body diagram for one-planar 4-bar parallelogram linkage 3, where at fixed support joint 22, applied force 51 is equal to response force 52, and they are isolated from the response force induced bending moment 53, which is reacted as a force couple by ground support 36 through a pair of grounded links 31. One-planar 4-bar parallelogram linkage 3 is a mechanism that functions as a guided roller support and loads separator for fixed mounted cantilever beam 21.

In operation, Cantilever Beam Linkage 1 of 1$^{st}$ preferred embodiment, a mechanism and structural support for a rowing boat oar, is mounted on the side of a row boat for a person facing forward and rows the boat forward. He rows through reciprocal power and return stroke cycles 62 and 63, respectively. In a power stroke cycle 62 he tilt the boat oar paddle into water and stroke the boat oar in parallel motion from forward to aftward; and in a return stroke cycle 63 he tilt the boat oar paddle out of water and stroke the boat oar in parallel motion from aftward to forward. He may, in a powered stroke cycle, apply power in the form of applied force 51 at anywhere along cantilever beam 21 of the boat oar, but still have applied force 51 entirely equal to response force 52 on oar paddle 23 in water, and propelling boat forward.

Referring to FIGS. 6-12, Cantilever Beam Linkage 1 of 2$^{nd}$ preferred embodiment of the invention is a mechanism and structural support for flapping aircraft/bird wings, comprising: a cantilever beam assembly 2, aligned and extends out of a narrow body width, is fixed mounted on two-planar 4-bar parallelogram linkage 4 in a triangular space truss that fits within a narrow and long body, and been supported by ground support 44 with 3-D pinned joint. Cantilever Beam Linkage 1 of 2$^{nd}$ preferred embodiment is a mechanism in 3-D space, and when subjected to loading 5, has only one 3-D space degree of freedom in lateral strokes motion 6.

Cantilever Beam Linkage 1 of 2$^{nd}$ preferred embodiment is shown particularly in FIGS. 6, 7, and 8, where cantilever beam assembly 2 is further comprised of two cantilever beams 21, with each cantilever beam 21 same as for the 1$^{st}$ preferred embodiment, but is fixed supported at one end to fixed support joint 22, and a wing at the other end instead paddle 23. Two-planar 4-bar parallelogram linkage 4 in a triangular space truss has sides 41, 42, and 43, and is further comprised of: each side 41 and 42 has one identical one-planar 4-bar parallelogram linkage 3, and side 43 is triangular space truss support base made of two ground links 33; sides 41 and 42 are joined together by shared floating link 32; onto floating link 32 is fixed mounted cantilever beam 21 through fixed support joint 22; and ground links 33, when representing the ground, and pin joints 35 are removed from two-planar 4-bar parallelogram linkage 4. Mid-plane of sides 41 and 42 is aligned with and fit within the long body length, and side 43 is aligned with and fit within the narrow body width. Two-planar 4-bar parallelogram linkage 4 is supported by ground support 44 with 3-D pinned joint.

Shown particularly in FIGS. 9, 10, 11, and 12 are Cantilever Beam Linkage 1 of 2$^{nd}$ preferred embodiment as a mechanism, been subjected to reciprocal loads 5, moves in reciprocal motion 6. Cantilever beam 21, subjected to in-plane reciprocal applied forces 51 anywhere along cantilever beam 21, moves in reciprocal stroke motions 6, and generates response forces 52 equal to applied forces 51, regardless of the narrow body width relative to cantilever beam 21 length; where in-plane refers to in the orthogonal plane to the mid-plane of two triangular space truss sides 41 and 42, and aligned with narrow body width. Cantilever beam 21 in reciprocal stroke motion 6 has maximum reciprocal stroke distance 61, same as for floating link 32, to equal to 2× the length of grounded links 31 projected on mid-plane of sides 41 and 42, and in one cycle it moves through power stroke 62 and return stroke 63.

Two-planar 4-bar parallelogram linkage 4 is a triangular space truss in 3-D space, been constrained by side 41 and side 42, and when subjected to loading 5, it has only one 3-D space degree of freedom in the mid-plane for lateral strokes motion 6, same as for one 2-D space degree of freedom of one-planar 4-bar parallelogram linkage 3 in 2-D space. Other comparisons are: both have floating link 32 moves in reciprocal parallel stroke motions 61 as guided roller support, free to translate, but fixed for rotation, except floating link 32 of two-planar 4-bar parallelogram linkage 4 has maximum reciprocal stroke distance 61 equal to 2× the length of grounded links 31 projected on mid-plane of sides 41 and 42; referring in particular to FIG. 5 of a free body diagram for one-, but is also applicable to two-planar 4-bar parallelogram linkage 4, both use floating link 32 to isolate applied force 51 and response force 52 from response induced bending moment 63 at fixed support joint 22, where applied force 51 is equal to response force 52, and where the response force induced bending moment 53 is reacted as a force couple and grounded out by pairs of grounded links 31; and both are mechanisms that function as guided roller supports and loads separators.

In operation, Cantilever Beam Linkage 1 of 2$^{nd}$ preferred embodiment, a mechanism and structural support for flapping aircraft/bird wings, is mounted to a narrow and long flying machine body, with triangular space truss mid plane of sides 41 and 42 aligned and fitted within the long body length, and side 43 of base support side aligned and fitted within the narrow body width, and cantilever beam 21 aligned and extends out of the narrow body width. Cantilever beam 21 reciprocal stroke motions under applied load 51 flaps a pair of wings mounted on it in motion 6 to generate response force 52 as lift force for flight. Reciprocal applied force 51 is the total power exerted by a person through complete reciprocal motion 6 cycles of power strokes 62 and return strokes 63, and entire applied force 51 is transferred to response force 52, which must be greater than the total flying machine weight for liftoff and flight. Cantilever Beam Linkage 1 of 2$^{nd}$ preferred embodiment of the invention provides a mechanism and structural support that functions as a guided roller support and loads separator for a flying machine, and does not address systems required to convert human power through power strokes 62 and return stroke 63 in cycles to reach an applied force 51 equal to a response force 52 that is greater than the total weight of a flying machine for liftoff and flight. Nor does it addresses other critical systems required for flight, such as wings for flying machines.

The embodiments described above are for the purpose of describing features and technical conceptions of the apparatus of the invention, but it should be readily apparent that the invention is not limited to the described embodiments alone. A person skilled in the art may come up with various changes and modifications consistent to the technical concept disclosed herein and within the spirit and scope of the invention. Therefore, it is to be understood that modifications and variations may be utilized without departure from the spirit and scope of the invention disclosed herein, as those skilled in the art will readily understand. Such modifications and variations are considered to be within the purview and scope of the claimed invention and their equivalents.

I claim:
1. A cantilever beam linkage comprising:
   a single planar 4-bar parallelogram linkage, having one degree of freedom in-plane of the 4-bar parallelogram linkage, and including in-plane of the 4-bar parallelogram linkage a ground link connected to a narrow body by fixed supports, a pair of grounded links each of which is connected at one end to each end of the ground link by a pin joint, and a floating link connected at each end to one other end of each of the grounded links by a pin joint;

and a cantilever beam fixedly connected adjacent one end of the cantilever beam to the floating link between the pin joints and extending from the floating link beyond the ground link.

2. The cantilever beam fixedly connected to the floating link having one degree of freedom in-plane of the 4-bar parallelogram linkage, as recited in claim 1, wherein:

reciprocal forces in parallel to the floating link applied anywhere along the cantilever beam cause the cantilever beam, for beam fix connected to the floating link, to be in reciprocal parallel stroke motions with the floating link;

and the cantilever beam in reciprocal motions subjected to the reciprocal applied forces generate equal and opposite reciprocal response forces.

3. A cantilever beam linkage comprising:

a two-planar 4-bar parallelogram linkage, having one degree of freedom in-planes of the two-planar 4-bar parallelogram linkage, and including in-planes of the two 4-bar parallelogram linkages a pair of identical ground links connected to a narrow body by fixed supports wherein the ground links are parallel and spaced apart one from the other, four grounded links wherein one grounded link is connected to each end of each of the pair of ground links by pin joints and at an opposite end to a common floating link by pin joints at each end of the common floating link;

and a cantilever beam fixedly connected to the common floating link between the pin joints of the common floating link.

4. The cantilever beam fixedly connected to the common floating link having one degree of freedom in-planes of the two-planar 4-bar parallelogram linkage, as recited in claim 3, wherein:

reciprocal forces in parallel to the floating link applied anywhere along the cantilever beam cause the cantilever beam, for beam fix connected to the floating link, to be in reciprocal parallel stroke motions with the floating link;

and the cantilever beam in reciprocal motions subjected to the reciprocal applied forces generate equal and opposite reciprocal response forces.

* * * * *